(12) United States Patent
Wai et al.

(10) Patent No.: US 7,262,979 B2
(45) Date of Patent: Aug. 28, 2007

(54) CURRENT SOURCE WAVE VOLTAGE INVERTER VOLTAGE-CLAMPING AND SOFT-SWITCHING TECHNIQUES, AND FUEL CELL SYSTEM USING THE SAME

(75) Inventors: Rong-Jong Wai, Liouying Township, Tainan County (TW); Rou-Yong Duan, Guosing Township, Nantou County (TW)

(73) Assignee: Yuan Ze University, Taoyuan (TW)

( * ) Notice: Subject to any disclaimer, the term of this patent is extended or adjusted under 35 U.S.C. 154(b) by 0 days.

(21) Appl. No.: 11/534,003

(22) Filed: Sep. 21, 2006

(65) Prior Publication Data

US 2007/0081368 A1 Apr. 12, 2007

Related U.S. Application Data

(63) Continuation-in-part of application No. 10/864,714, filed on Jun. 9, 2004, now abandoned.

(51) Int. Cl.
*H02H 7/122* (2006.01)
*H02M 7/44* (2006.01)
(52) U.S. Cl. ..................... 363/56.03; 363/98
(58) Field of Classification Search .............. 363/55, 363/56.01, 56.03, 56.04, 97, 98, 131, 132
See application file for complete search history.

(56) References Cited

U.S. PATENT DOCUMENTS

| | | | | |
|---|---|---|---|---|
| 5,841,644 A | * | 11/1998 | Lipo et al. | 363/37 |
| 6,091,615 A | * | 7/2000 | Inoshita et al. | 363/98 |
| 6,111,770 A | * | 8/2000 | Peng | 363/131 |
| 6,330,170 B1 | * | 12/2001 | Wang et al. | 363/37 |
| 6,876,556 B2 | * | 4/2005 | Zhu et al. | 363/17 |
| 6,898,093 B2 | * | 5/2005 | Ambo et al. | 363/56.05 |

* cited by examiner

*Primary Examiner*—Gary L Laxton

(57) ABSTRACT

A current-source sine-wave voltage inverter for converting a direct current (DC) voltage to an alternating (AC) voltage includes a DC source for providing a DC voltage, a current source circuit having a primary side inductance of a transformer, a clamping circuit, an inverting circuit, and a control and driving circuit. The clamping circuit includes a first switch cascaded with a first diode, a second diode cascaded with a second switch, a first capacitor connected between an anode of the first diode and a cathode of the second diode, a secondary side inductance of the transformer cascaded with a third diode, the secondary side inductance of the transformer and the third diode connected to two ends of the DC source, and a cathode of the third diode connected to an anode of the DC source. The present invention also provides a fuel cell system.

17 Claims, 9 Drawing Sheets

Mode 6 ($t_6 \sim t_7$)

* Efficiency-Power
o Voltage-Power

CURRENT SOURCE WAVE VOLTAGE INVERTER VOLTAGE-CLAMPING AND SOFT-SWITCHING TECHNIQUES, AND FUEL CELL SYSTEM USING THE SAME

RELATED APPLICATIONS

This application is a continuation-in-part of U.S. patent application Ser. No. 10/864,714, filed on Jun. 9, 2004 now abandoned.

BACKGROUND

1. Field of the Invention

The present invention relates to a current-source sine wave voltage inverter and a fuel cell system using the same, more particularly, to a current-source sine wave voltage inverter using voltage-clamping and soft-switching techniques, which converts a direct current (DC) source to an alternating current (AC) sine wave voltage using a difference between AC sine wave voltage command and feedback voltage to control the turn-on time of switches, and using an inductor to generate a current source to charge capacitors via positive/negative cycles of full-bridge switch to adjust a rise and fall range of voltage to provide linear voltage regulation.

2. Description of the Prior Art

Presently there are two kinds of products which can convert a DC source to a 60 Hz AC voltage. One is an inverter of AC motor, which uses a coil inductor of motor and a PWM (pulse width modulation) technique to generate a sine-wave-like current. However, it is not suitable for resistive or capacitive loads, therefore basically, the inverter is not for home appliances or computer products. The other is a modification of the inverter, such as UPS (Un-interruptible Power Supply), which adds a LC filter circuits at the output and a feedback circuit to provide a constant voltage, regardless of various loads and input voltages. Besides, batteries and charging/discharging circuits are often included to provide a back-up power source in addition to a utility power. Nowadays Taiwan has become a leader in UPS products and related techniques, nevertheless, there are a few issues remained to be solved. Firstly, an output current will have to pass through a filter inductor, and in consideration of the −3 dB response of second order resonance circuit. A common UPS has mH-level of inductance, therefore the filter inductor will increase the product's weight and energy transfer loss. Secondly, the voltage L·di/dt between two ends of the filter inductor is the difference between a DC voltage and an output voltage. While the minimum value occurs around a sine wave peak, the output waveform tends to distort around the sine wave peak turning point and generate high-frequency harmonic components due to the filter inductor. Therefore, it is inevitable even with a higher filter voltage. Though the inductor is intended for a filter use, it also limits the regulation ability under loads being varied suddenly. Thirdly, a few kinds of loads, such as half-wave rectifying loads or highly inductive loads, could harm the driving circuit due to the symmetry of an LC filter circuit waveform, and highly inductive loads could change the frequency response of a second order filter circuit as well. A DC voltage level have to be raised in case the output sine wave voltage is too low, and consequently the system could be damaged due to an overly high voltage. Fourthly, the voltage distortion rate of non-resistive loads, generally refers to Total Harmonic Distortion (THD), is far more higher than resistive loads, because the traditional second order filter circuit is not capable of handling non-resistive loads, such as inductive, capacitive and nonlinear loads.

Besides, switching loss increases as switching frequency rises, which in turn decreases the system efficiency, many manufacturers started to apply various soft-switching techniques to high power IGBT switches, several papers prove that decreases the PWM switching loss will help to increase switching frequency and improve output voltage waveform.

Compared to traditional PWM methods, the sine wave voltage of current source inverter is mostly used for charging the capacitor to accumulate sine wave voltage under various loads and frequency changes. However, due to the large inductor used in current source, it's hard to control the inductor circuit and to realize soft-switching techniques, resonant voltage and high current issues are difficult to overcome. Recently the Institute of Electrical and Electronic Engineers (IEEE) proposed a voltage-clamping technique to handle current source inverter, the circuit exhibited soft-switching characteristics, which also restrains the switch voltage under the factor of 4, nevertheless, the imaginary part of the inductor current in the current source is too high, it's hard to decrease the volume. Besides, issues such as high ripples in the voltage waveform, no field experiment available and the driving object being an inductance motor still exist.

Therefore, the above-mentioned devices present several shortcomings to be overcome.

In view of the above-described deficiency of prior-art devices, after years of constant effort in research, the inventor of this invention has consequently developed and proposed a current-source sine wave voltage inverter using voltage-clamping and soft-switching techniques.

BRIEF SUMMARY

A current-source sine-wave voltage inverter for converting a direct current (DC) voltage to an alternating (AC) voltage includes a DC source for providing a DC voltage, a current source circuit having a primary side inductance of a transformer, a clamping circuit, an inverting circuit, and a control and driving circuit. The clamping circuit includes a first switch cascaded with a first diode, a second diode cascaded with a second switch, a first capacitor connected between an anode of the first diode and a cathode of the second diode, a secondary side inductance of the transformer cascaded with a third diode, the secondary side inductance of the transformer and the third diode connected to two ends of the DC source, and a cathode of the third diode connected to an anode of the DC source. The inverting circuit is a full-bridge dc-ac inverting circuit which comprising diagonally opposite a third switch and a fourth switch, a fifth switch and a sixth switch from two legs, a fourth diode, a fifth diode, a sixth diode and a seventh diode used for avoiding the short current from a second capacitor to pass through the first, second, third, fourth, fifth and sixth switches or the first, second, third, fourth, fifth, sixth, and seventh diodes. The control and driving circuit includes a single-phase voltage and frequency command signal and then further makes a logic determination, a delay operation, isolates an amplified driving current and triggers and cuts off the first, second, third, fourth, fifth and sixth switches. When an output voltage is at an upper half cycle of the sine wave, current flowing from the DC source through the primary side inductance and the first and second switches, then via the third and fourth switches to charge the second capacitor. When an output voltage is at a lower half cycle of the sine wave, the first, second, third, and fourth switches turn on at the same time to discharge the second capacitor. When the primary side inductance is forward-biased, the third diode is reverse-biased, no current flowing through the secondary side inductance, and current on the primary side inductance storing energy at the transformer. When the first and second switches cut off, the primary side inductance reverses a voltage polarity (the polarity of the black spots is negative), the third diode is forward-biased, a current on the secondary side inductance will release the energy stored in the transformer to the DC source; and during the energy releasing time, the voltage value of the secondary side inductance is the same as the source's, and the voltage value of the primary side inductance will be limited by turns ratio of the primary and secondary side inductances. The first capacitor and the first and second diodes all connect either sides of the first and second switches to enable a zero voltage switching (ZVS) property of the first and second switches when the first and second switches cut off. When a current on the secondary side inductance is zero, which means all stored energy in the transformer has been released, then if any one of the first, second, third, fourth, fifth and sixth switches on the primary side turns on, it will have a zero current switching (ZCS) property.

A fuel cell system includes a fuel cell for providing a direct current (DC) voltage, a DC to DC converter circuit, and a current-source sine-wave voltage inverter for converting the DC voltage to an alternating (AC) voltage. The current-source sine-wave voltage inverter includes a DC source for providing a DC voltage, a current source circuit having a primary side inductance of a transformer, a clamping circuit, an inverting circuit, and a control and driving circuit. The clamping circuit includes a first switch cascaded with a first diode, a second diode cascaded with a second switch, a first capacitor connected between an anode of the first diode and a cathode of the second diode, a secondary side inductance of the transformer cascaded with a third diode, the secondary side inductance of the transformer and the third diode connected to two ends of the DC source, and a cathode of the third diode connected to an anode of the DC source. The inverting circuit is a full-bridge dc-ac inverting circuit which comprising diagonally opposite a third switch and a fourth switch, a fifth switch and a sixth switch from two legs, a fourth diode, a fifth diode, a sixth diode and a seventh diode used for avoiding the short current from a second capacitor to pass through the first, second, third, fourth, fifth and sixth switches or the first, second, third, fourth, fifth, sixth, and seventh diodes. The control and driving circuit includes a single-phase voltage and frequency command signal and then further makes a logic determination, a delay operation, isolates an amplified driving current and triggers and cuts off the first, second, third, fourth, fifth and sixth switches. When an output voltage is at an upper half cycle of the sine wave, current flowing from the DC source through the primary side inductance and the first and second switches, then via the third and fourth switches to charge the second capacitor. When an output voltage is at a lower half cycle of the sine wave, the first, second, third, and fourth switches turn on at the same time to discharge the second capacitor. When the primary side inductance is forward-biased, the third diode is reverse-biased, no current flowing through the secondary side inductance, and current on the primary side inductance storing energy at the transformer. When the first and second switches cut off, the primary side inductance reverses a voltage polarity (the polarity of the black spots is negative), the third diode is forward-biased, a current on the secondary side inductance will release the energy stored in the transformer to the DC source; and during the energy releasing time, the voltage value of the secondary side inductance is the same as the source's, and the voltage value of the primary side inductance will be limited by turns ratio of the primary and secondary side inductances. The first capacitor and the first and second diodes all connect either sides of the first and second switches to enable a zero voltage switching (ZVS) property of the first and second switches when the first and second switches cut off. When a current on the secondary side inductance is zero, which means all stored energy in the transformer has been released, then if any one of the first, second, third, fourth, fifth and sixth switches on the primary side turns on, it will have a zero current switching (ZCS) property.

The current-source sine wave voltage inverter using voltage-clamping and soft-switching techniques, such as:

1. Voltage-clamping: using the conservation of magnetic flux in the transformer to force the system to operate in designated voltage range, therefore voltage specification to be sustained by the components and component cost will be reduced.
2. Quasi-resonant property: using the continuous voltage property of the LC resonance circuit to enable ZVS (Zero Voltage Switching) effects for all switches and diodes.
3. Controlling the inductance current in discontinuous conduction mode: to let the inductor current to rise from 0 to turn on the switches and diodes at zero current (Zero Current Switching, ZCS).

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
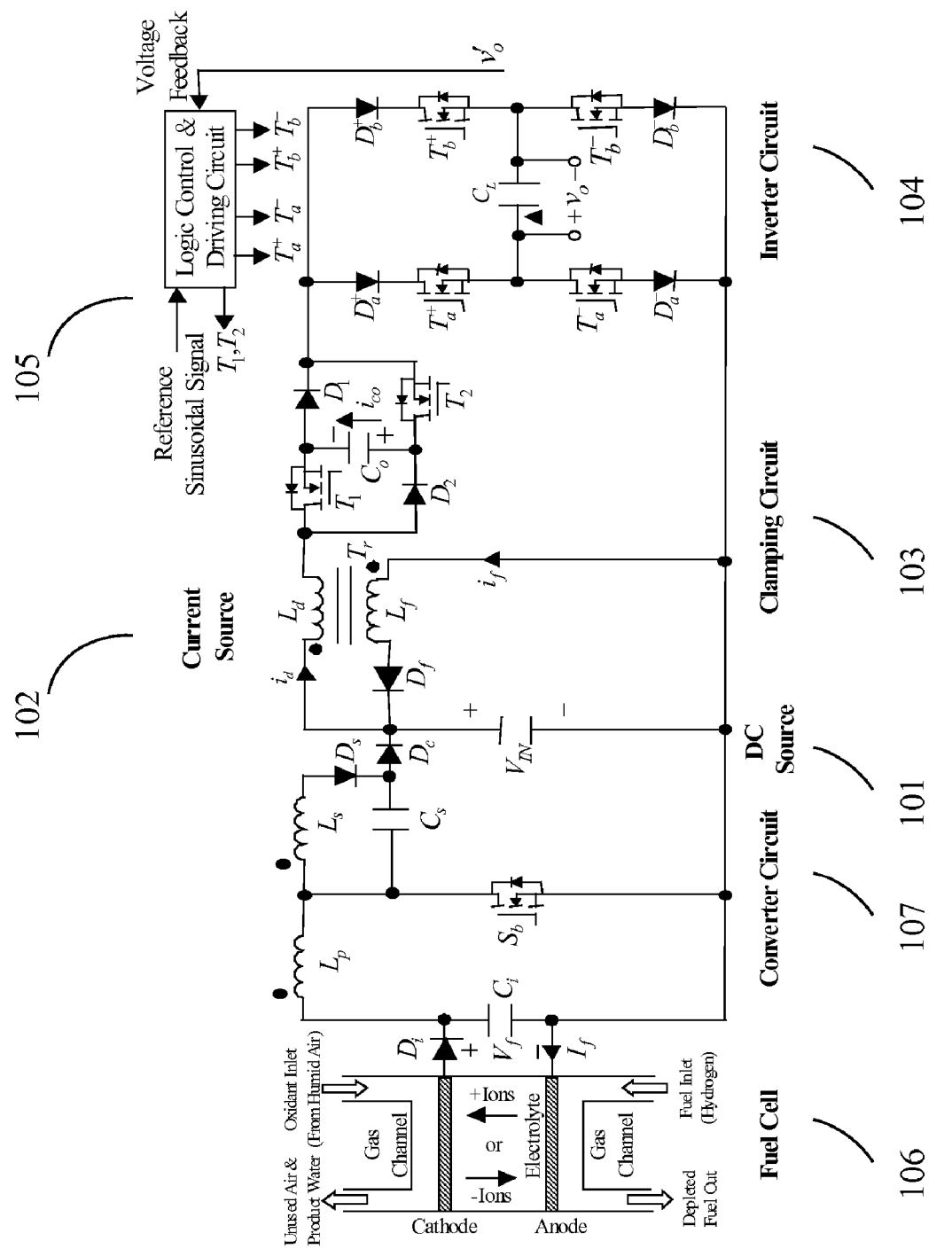
FIG. 1 illustrates a block diagram of a fuel cell system having a current-source sine wave voltage inverter using voltage-clamping and soft-switching techniques according to a preferred embodiment of the present invention.

FIG. 1 illustrates a block diagram of a fuel cell system having a current-source sine wave voltage inverter using voltage-clamping and soft-switching techniques according to a preferred embodiment of the present invention. The fuel cell system includes a fuel cell 106, a DC-DC converter circuit 107, and a current-source sine wave voltage inverter which can convert a DC voltage into an AC sine wave voltage. The fuel cell 106, the DC-DC converter circuit 107, and the current-source sine wave voltage inverter are cascaded in the order. The fuel cell 106 involves converting a chemical energy directly into an electrical energy. The DC-DC converter circuit 107, and the current-source sine wave voltage inverter is utilized to delivery the electrical energy outputting from the fuel cell 106 to AC electric equipment applications.

The fuel cell 106 includes an anode, a cathode, a catalyst and an electrolyte. The main function of the electrodes (that is, the anode and the cathode) is to bring about a reaction between the reactant and the electrolyte. The anode, used as a negative post in the fuel cell, disperses hydrogen gases equally over the entire catalyst surface and conducts electrons for being used as power in an external circuit. The cathode, used as a positive post in the fuel cell, distributes oxygen fed to it onto the catalyst surface and conducts electrons back from the external circuit. The catalyst is a special material used to facilitate the oxygen and hydrogen reaction. In addition, the fuel cell 106 can further includes an ultracapacitor $C_i$ and a diode $D_i$ cascaded with each other. The ultracapacitor $C_i$ has an electrode electrically connected to the anode of the fuel cell. The diode $D_i$ has an anode electrically connected to the cathode of the fuel cell. The ultracapacitor $C_i$ is utilized to help maintain a bus voltage during transients and start-up. The diode $D_i$ at the output of the fuel cell stack is utilized to prevent the negative current going into the stack.

According to the chemical characteristics of the electrolyte used as the ion conductor in the cells, the most promising types are classified as four kinds. A first fuel cell may be a Proton exchange membrane fuel cell (PEMFC) or a direct methanol fuel cell (DMFC), which use a polymer membrane as the electrolyte. A second fuel cell may be a Phosphoric acid fuel cell (PAFC), which uses pure phosphoric acid as the electrolyte. A third fuel cell may be a Molten carbonate fuel cell (MCFC), which uses a molten mixture, sodium, and potassium carbonates as the electrolyte. A fourth fuel cell may be a Solid oxide fuel cell (SOFC), which uses a ceramic material as the electrolyte. In this preferred embodiment, the fuel cell 106 is a PEMFC.

The PEMFC consists of porous carbon electrodes bound to a thin sulphonated polymer membrane. The anode, cathode, and net cell reactions of the PEMFC can be represented as

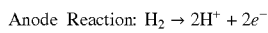
Anode Reaction: $H_2 \rightarrow 2H^+ + 2e^-$

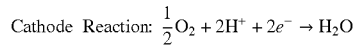
Cathode Reaction: $\frac{1}{2}O_2 + 2H^+ + 2e^- \rightarrow H_2O$

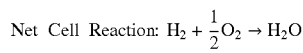
Net Cell Reaction: $H_2 + \frac{1}{2}O_2 \rightarrow H_2O$ where the mobile ion is $H^+$. The membrane electrode assembly (MEA) is sandwiched between two collector plates that provide an electrical path from the electrodes to the external circuit. Flow channels cut into the collector plates distribute reactant gases over the surface of the electrodes. Individual cells consisting of collector plates and MEAs are assembled in series to form a fuel cell stack.

The DC-DC converter circuit 107 is a high-efficiency, high step-up dc-dc converter to solve a problem induced by the fuel cell power characteristics of a low voltage as well as a high current. The DC-DC converter circuit 107 includes coupled windings $L_p$, $L_s$, a capacitor $C_s$ having an electrode connected to coupled ends of the windings $L_p$, $L_s$, and a transistor $S_b$ cascaded between the ultracapacitor $C_i$ and the coupled ends of the windings $L_p$, $L_s$. This DC-DC converter circuit 107 uses diodes and coupled windings instead of active switches to recycle the leakage inductor energy with better performance than the conventional active-clamped counterparts. Moreover, the reverse-recovery problem also can be significantly alleviated.

The current-source sine-wave voltage inverter includes a DC source 101, a current source circuit 102, a clamping circuit 103, and an inverting circuit 104, and a control and driving circuit 105. The clamping circuit 103 includes switches $T_1$ and $T_2$, diodes $D_1$ and $D_2$, a capacitor $C_o$ and one transformer $T_r$, in which the symbols $L_d$ and $L_f$ denote a primary and secondary magnetizing inductance of the transformer $T_r$. The switch $T_1$ is cascaded with the diode $D_1$, and the switch $T_2$ is cascaded with the diode $D_2$. The diode $D_1$ has a cathode is connected to an end of the switch $T_2$, and the diode $D_2$ has an anode is connected to an end of the switch T. The capacitor $C_o$ is connected between an anode of the diode $D_1$ and a cathode of the diode $D_2$. The additional object of this inductor $L_d$ can be used to limit a charge current, and the ascendant rate of the inductor current is proportional to its across voltage. The inverting circuit 104 may be a full-bridge dc-ac inverting circuit which is composed of diagonally opposite switches $T_a^+$, $T_b^-$ and $T_b^+$, $T_a^-$; from two legs. Note that, the additional diodes $D_a^+$, $D_a^-$, $D_b^-$, and $D_b^-$ are used for avoiding the short current from capacitor $C_L$ to pass through the current-source sine-wave voltage inverter switches or their body diodes.

When the output voltage is at the upper half cycle of the sine wave, current flowing from the DC source 101 through the inductor $L_d$ of the current source circuit 102 and the switches $T_1$, $T_2$ of the clamping circuit 103, then via the switches $T_a^+$, $T_b^-$ of the inverter circuit 104 to charge the output capacitor $C_L$. Similarly, when the output voltage is at the lower half cycle of the sine wave, switches $T_1$, $T_2$, $T_a^+$, $T_a^-$ turning on at the same time to discharge the output capacitor $C_L$. The inductor $L_d$ of the current source circuit 102 is placed among voltage sources $V_{IN}$, $V_{C0}$ and $v_o$, to limit the current value, the ascending rate of the inductor current being proportional to a voltage applied to inductor, while the inductor $L_d$ is an excited inductor of the primary side of a high exciting current transformer, and the inductor $L_f$ is the excited inductor of the secondary side.

There are four purposes to the clamping circuit 103. The first purpose is cascaded with inverter circuit to control switches $T_1$, $T_2$ to turn on/off the inverter current. The second purpose is that the capacitor $C_0$ and the diodes $D_1$, $D_2$ all connect either sides of $T_1$ and $T_2$ to enable a zero voltage switching (ZVS) property of $T_1$ and $T_2$ when they cut off. The third purpose is to release the energy left in the transformer $T_r$ using fly back principle, in other words, when the primary side of the transformer is forward-biased (the polarity of the black spots in FIG. 1 is positive), the diode $D_f$ is reverse-biased, no current flowing through the secondary side, and current on the primary side storing energy at the transformer $T_r$. When switches $T_1$ and $T_2$ cut off, the primary side of the transformer $T_r$ reverse a voltage polarity (the polarity of the black spots is negative), the diode $D_f$ is forward-biased, a current $i_f$ on the secondary side will release the energy stored in the transformer to the DC source 101, therefore the current is also referred to as a feedback current. During the energy releasing time, the voltage value of the secondary side of the transformer $T_r$ is the same as the source's (while the voltage drop of diode and resistance should be ignored), and the voltage value of the primary side will be limited by turns ratio, therefore the structure disclosed herein is able to clamp two times the voltage of the DC source 101. The fourth purpose is, when the current $i_f$ on the secondary side is zero, which means all stored energy in the transformer $T_r$ has been released, then if any switch on the primary side turns on, it will have a zero current switching (ZCS) property, that is, the initial current of the inductor $L_d$ is zero. Therefore, the clamping circuit 103 not only limits the highest voltage of the fuel cell system, but it also provides soft-switching effects.

The inverter circuit 104 is implemented in full-bridge structure using switches $T_a^+$, $T_b^-$, $T_b^+$, $T_a^-$ cascaded with diodes $D_a^+$, $D_a^-$, $D_b^+$, and $D_b^-$, so there won't be a short circuit path for an output capacitor. The inductor $L_d$ current charges the output capacitor $C_L$, and a sine wave output voltage value can be obtained by integration. The control and driving circuit 105 generates a driving signal, which compares a 60 Hz single-phase voltage command with the feedback voltage, then the control and driving circuit 105 sends the driving signal to the six switches $T_1$, $T_2$, $T_a^+$, $T_b^-$, $T_b^+$, and $T_a^-$. Some of the switches of the inverter circuit 104, such as $T_a^+$, $T_b^-$ and $T_a^-$, $T_b^+$, switch according to bipolar mode and turn-on delay time control method; after a logic control circuit processes the two sets of signals and sends them to the switches $T_1$, $T_2$ of the clamping circuit 103 as driving signals, the bridge switches will act accordingly and have ZCS and ZVS properties.

Figure 2:
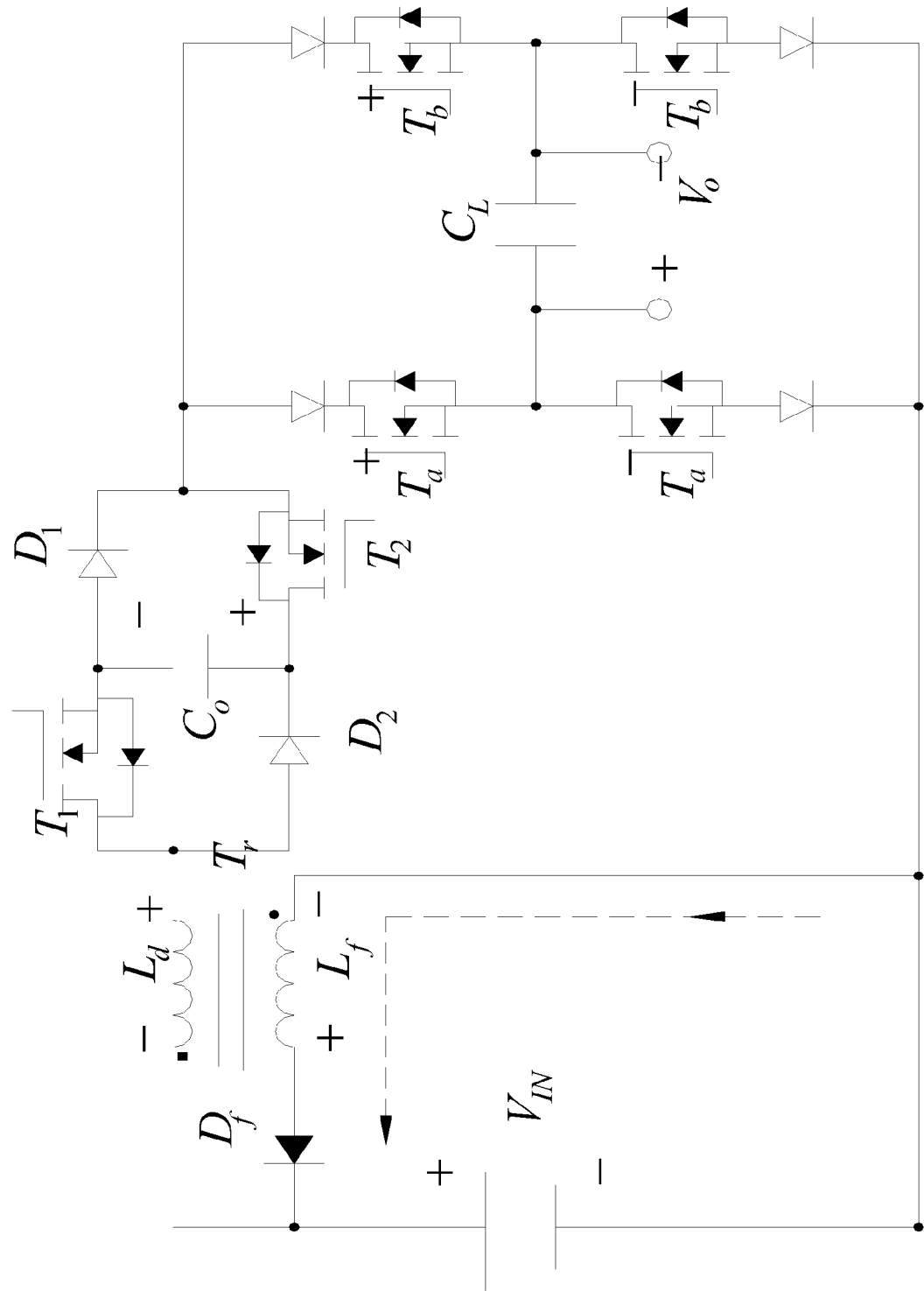
FIG. 2 illustrates working modes of the current-source sine wave voltage inverter using voltage-clamping and soft-switching techniques of FIG. 1.
Figure 3:
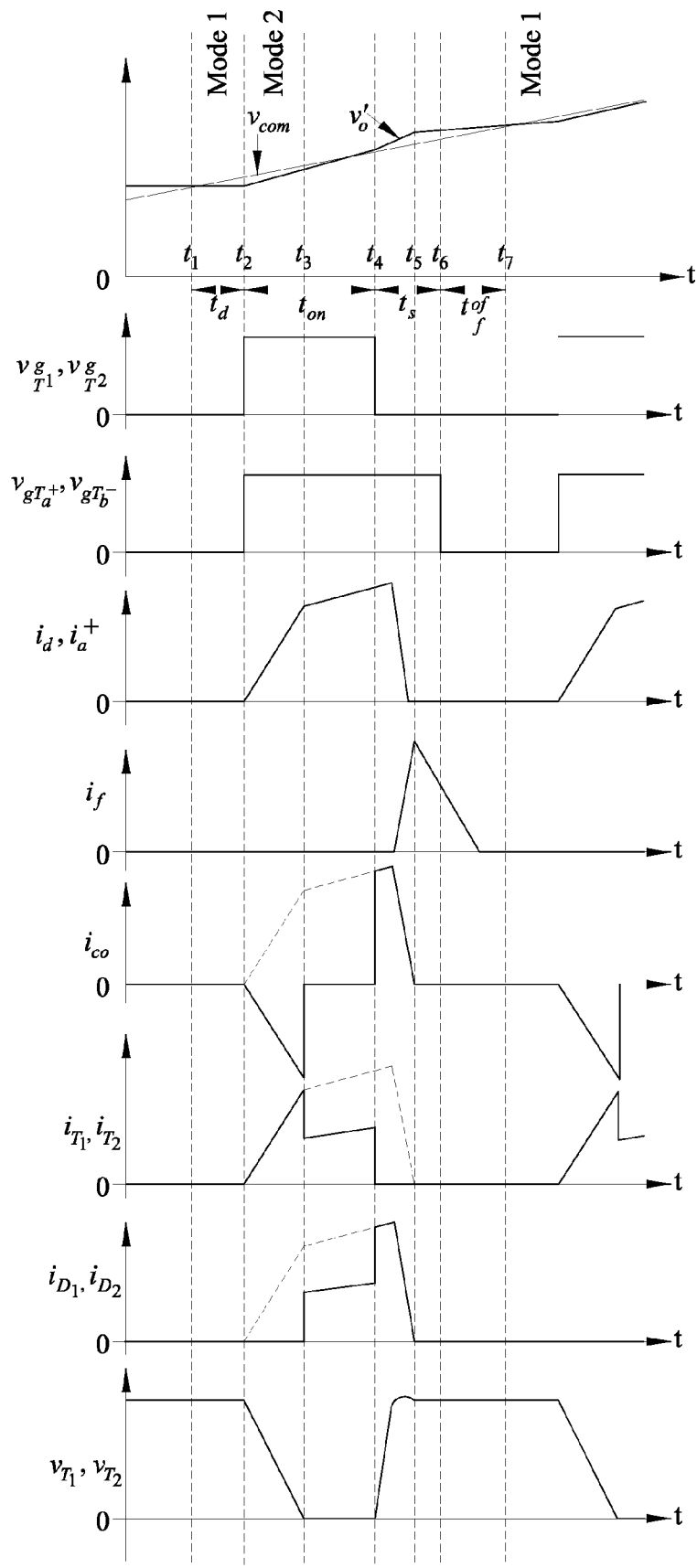
FIG. 3 illustrates various waveforms of components of the current-source sine wave voltage inverter using voltage-clamping and soft-switching techniques of FIG. 1.

FIG. 2 shows various working modes of the driving circuit. FIG. 3 shows the waveforms at various points of the driving circuit. Based on FIG. 2 and FIG. 3, the working principles of the current-source sine-wave voltage inverter are detail described as the flowing.

1. Mode 1: Time $t_1 \sim t_2$

As shown in mode 1 of FIG. 2, when a feedback voltage $v_o'$ is lower than a single-phase voltage and frequency command $v_{com}$, all the switches $T_1$, $T_2$, $T_a^+$, $T_b^-$, $T_b^+$, and $T_a^-$ will not turn on immediately. After time $t_d$, the switches $T_1$, $T_2$, $T_a^+$ and $T_b^-$ start to turn on, and this period is called turn-on delay time. There are two purposes for this: firstly, there will be enough time to release a magnetic flux stored inside the transformer $T_r$. According to conservation of the magnetic flux, anti-magneto motive force will force the diode $D_f$ to be forward-biased, using the feedback current $i_f$ to release energy of the transformer $T_r$ and preparing for the next ZCS turn-on stage. Suppose a peak value of the feedback current $i_f$ is $i_{fmax}$, the time for the feedback current $i_f$ to drop from peak value to zero is $t_f$, then $$-L_f di/dt = V_{IN} \tag{1}$$

After doing integration of the above equation, the time needed for the feedback current $i_f$ of the secondary side of the transformer $T_r$ to be cut off is:

$$t_f = L_f i_{fmax} / V_{IN} \tag{2}$$

When the time $t_f$ is very small, which means the current in transformer reduces to zero quickly and no current flows in coil, i.e., no loss in transformer, therefore the overall system efficiency is improved. When the time $t_d > t_f$ it is for sure that the magnetic flux in the transformer $T_r$ is zero, so it's necessary to estimate the maximum charging current of the output capacitor $C_L$. Secondly, it is viable to limit the maximum switching frequency for switches $T_1$, $T_2$, $T_a^+$ and $T_b^-$, suppose the switching cycle to be:

$$T = t_d + t_{on} + t_s + t_{off} \tag{3}$$

wherein $t_{on}$ is the turn-on time for switches $T_1$, $T_2$ of voltage-clamping circuit; $t_s$ is the cut-off delay time for $T_1$, $T_2$ in cut-off state and $T_a^+$, $T_b^-$ still in turn-on state; $t_{off}$ is the time that output voltage is bigger than command voltage, and all the six switches $T_1$, $T_2$, $T_a^+$, $T_b^-$, $T_b^+$, and $T_a^-$ cut off. For $t_d$ and $t_s$ are predefined value of the circuit, and $t_{on}$, $t_{off}$ depend on the loads and waveform, therefore the maximum value of switching frequency is:

$$f_{s(max)} < 1/(t_d + t_s) \tag{4}$$

2. Mode 2: Time $t_2 \sim t_3$

As shown in mode 2 of FIG. 2, before the time $t_2$, all energy in the transformer $T_r$ has been released, so the initial current of the inductor $L_d$ on the primary side is zero, and the inductor $L_d$ acts like a choke. At the time $t_2$, switches $T_1$, $T_2$ and $T_a^+$, $T_b^-$ are triggered, current flowing through the loop forming by the four switches $T_1$, $T_2$ and $T_a^+$, $T_b^-$, with its value building from zero, therefore when switches $T_1$, $T_2$ and $T_a^+$, $T_b^-$ turn on, they have ZCS properties. Suppose the initial voltage of capacitor $C_0$ is $V_c(0)$, the initial voltage of output capacitor $C_0$ is $V_c(0)$, and voltage and inductance leakage can be ignored, then the end-to-end voltage of inductor is the voltage of DC source adding that of $C_0$ and $C_L$, which is:

$$V_{IN} = L_d \cdot di/dt - v_c + v_o \tag{5}$$

Meanwhile the initial voltage of the capacitor $C_0$ will force the diode $D_1$ and $D_2$ to be reversely-biased and cut off, so the switches $T_1$, $T_2$ cascading with above-mentioned voltage storage components are turning on; the initial voltage of the capacitor $C_0$ comes from the cut-off energy drained in Mode 4. From equation (5), it is known that increase a climbing rate of the initial inductor current, making it similar to the inductor current in continuous mode will reduce turn-on time and a peak current value. The voltage of the capacitor $C_0$ is represented by:

$$v_c = V_c(0) - \frac{1}{C_0} \int_{t_2}^{t_3} i_d \, dt \quad t_2 \leq t \leq t_3 \tag{6}$$

3. Mode 3: Time $t_3 \sim t_4$

According to Kirchhoff's Voltage Law, the end to end voltage of the switches $T_1$ and $T_2$ of the clamping circuit 103 should be:

$$\begin{cases} V_{T_1} = V_{C_0} + V_{D_2} \\ V_{T_2} = V_{C_0} + V_{D_1} \end{cases} \tag{7}$$

Therefore the end to end voltage of diodes $D_1$, $D_2$ are $$\begin{cases} V_{D_2} = V_{T_1} + V_{C_0} \\ V_{D_1} = V_{T_2} + V_{C_0} \end{cases} \quad (8)$$

When the switches $T_1$, $T_2$ turn on, the end to end voltage will reduce to a saturated voltage, and when the capacitor $C_0$ discharges to near 0 volt, the end to end voltage of the diodes $D_1$, $D_2$ will move from reverse-bias to 0 volt then forward-bias, resulting in ZVS turn on state for the diodes $D_1$, $D_2$'. The current $i_d$ on the primary side will split into two parallel paths: $T_1$-$D_1$ and $D_1$-$T_1$ respectively, to charge the capacitor $C_L$, at this time the voltage of $V_{c0}$ is low:

$$V_{C_0} = V_{T_1} - V_{D_2} = V_{T_2} - V_{D_1} \quad (9)$$

4. Mode 4: Time $t_4 \sim t_5$

When the output feedback voltage is higher than the command voltage, the switches $T_1$ and $T_2$ trigger signals cut off, a current flow turns to $D_2$, $C_0$ and $D_1$, and the voltage $V_{c0}$ of the capacitor $C_0$ rises, which means that end to end voltage of switches $T_1$ and $T_2$ equals to the turn-on voltage of diode plus $V_{c0}$. Therefore, when both switches $T_1$ and $T_2$ cut off, they will have ZCS and ZVS properties. In the meantime, the current has the characteristics of semi-cascading resonance current of the inductor $L_d$ and the capacitors $C_0$, $C_L$. In the present invention, $L_d = L_f = 300$ uH, therefore, $$V_{L_d} = V_{IN} = (V_{c0} v_o)/2 \quad (10)$$

$V_{L_f} = V_{IN}$, and forces diode $D_f$ to be forward-biased and turn on. According to conservation of magnetic flux, because the output voltage of the active loop at the secondary side is low, the magnetic flux stored by primary side current will feed back to the DC source 101 via the coil $L_d$ of the secondary side. During the current crossover time between primary and secondary side, the voltages on both primary and secondary side will be dragged by $V_{c0}$, so the voltages are continuous, therefore, when $D_1$, $D_2$ cut off and $D_f$ turns on, they will all have ZVS and ZCS properties. From equation (10), when $v_o = 0$, $V_{c0}$ has the peak value of $2V_{IN}$, which determines the same voltage specification of switches T and $T_2$.

5. Mode 5: Time $t_5 \sim t_6$

When the feedback current begins to drop, the inductor current $i_d$ of primary side will all be transferred to secondary coil, at the same time, the current of the full-bridge switches is also zero, and the switch voltage is zero owing that cascading clamping circuit absorbs the voltage difference. The same can apply to cascaded $D_a^+$, $D_b^-$ pair, they both have ZCS and ZVS properties in cut off state. The voltage specification should conform to the condition that output voltage is reversely switching, therefore it is lower than the input DC voltage. The period between $t_4 \sim t_6$ is the crossover time for primary and secondary side, which is referred to as cut-off delay time. At time $t_6$, the current on the primary side is zero, all IGBT switch signals may be shut down.

6. Mode 6: Time $t_6 \sim t_7$

Time $t_7$ defines the beginning of next cycle ($v_o' = v_{com}$), which means output capacitor continuously discharges to power the loads, and the inductor feedback current continuously drops, besides, the length of time depends on the loads. In order to release the current until no magnetic flux is in the inductor and the current is in discontinuous mode for all switches turning on with ZCS characteristics, it is necessary to increase the turn-on delay time in mode 1.

When feedback current $i_f = 0$, the end to end voltage of $D_f$ equals to the disorderly resonance voltage of capacitor and inductor, with the resonance voltage starting from zero, and the diode $D_f$ have ZCS and ZVS properties in cut-off state. As to the switches $T_a^+$, $T_b^-$ and matched cascading diodes $D_a^+$, $D_b^-$ waiting to be turned on in the next stage, end to end voltages remain zero. From the analysis of mode 2, when they turn on, they all have ZCS and ZVS properties at the same time.

From the above, when most diodes and switches cut off or turn on, they can keep the ZCS and ZVS properties at the same time, and the rest can provide at least one of zero-voltage or zero-current switching properties. Therefore, theoretically, the driving circuit disclosed in the present invention provides high transfer efficiency.

The table depicted below lists all soft-switching capabilities for all modes:

TABLE 1 soft-switching properties under various modes

| components | ZVS Turn-on | ZVS cut-off | ZCS Turn-on | ZCS cut-off |
|---|---|---|---|---|
| $T_1$, $T_2$ | | ○ | ○ | ○ |
| $T_a^+$, $T_a^-$, $T_b^+$, $T_b^-$ | ○ | ○ | ○ | ○ |
| $D_1$, $D_2$ | ○ | ○ | | |
| $D_a^+$, $D_a^-$, $D_b^+$, $D_b^-$ | ○ | ○ | ○ | ○ |
| $D_f$ | ○ | ○ | ○ | ○ |

Figure 4:
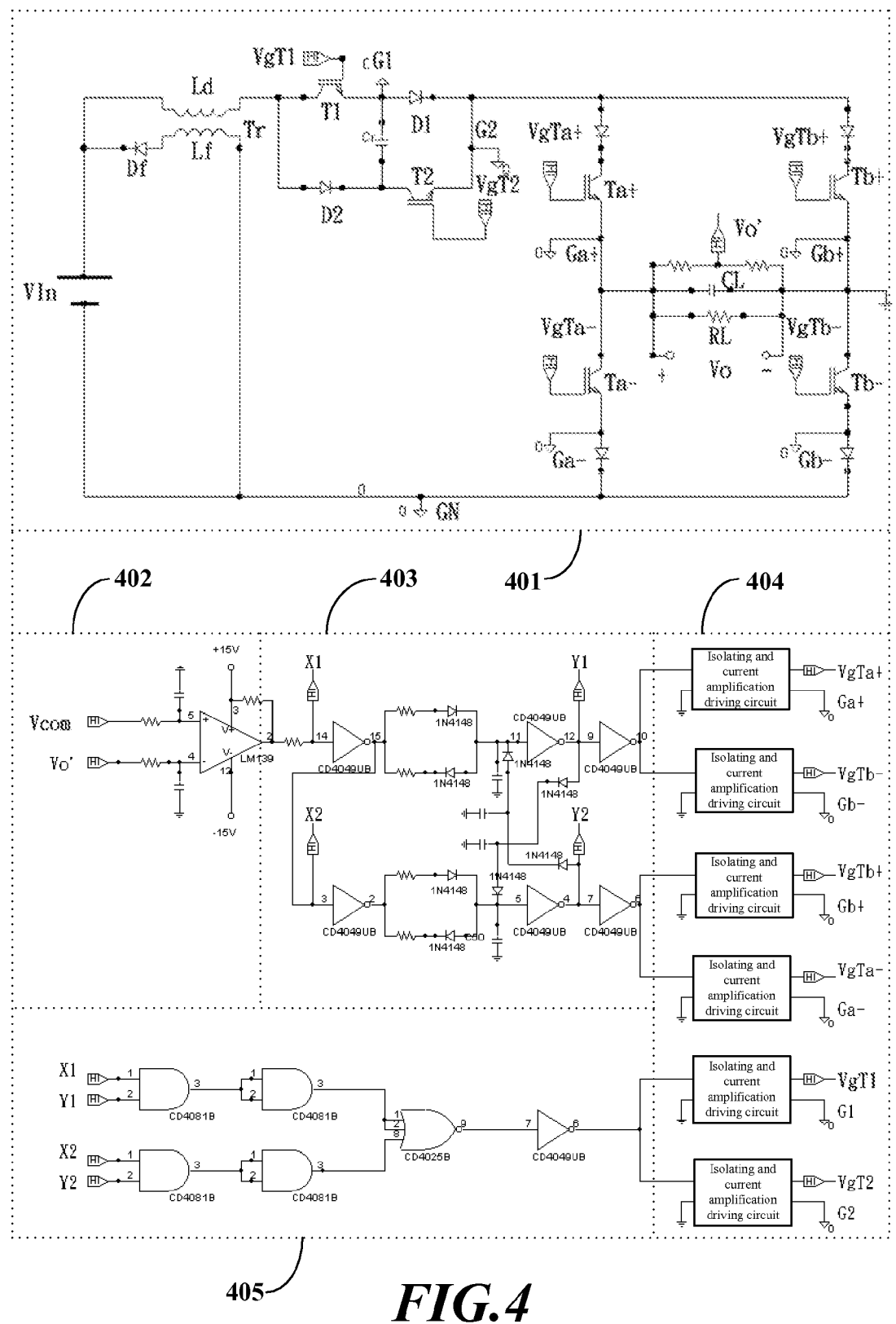
FIG. 4 shows an implementation of the current-source sine wave voltage inverter using voltage-clamping and soft-switching techniques of FIG. 1.

FIG. 4 shows the implementation of the current-source sine-wave voltage inverter using voltage-clamping and soft-switching techniques. The main circuit 401 is the higher voltage side with large current, the specification for the circuit is:

$V_{IN} = 170$ V DC
$v_o = 110$ $V_{r.m.s}$ 60 Hz
Switches: GT50J101
Diode: SFI604G
$T_r$:EE-55 $L_d = L_f = 300$ uH
$C_r = 0.047$ uF
$C_L = 20$ uF
switching frequencies: 5 kHz~20 kHz In a feedback control circuit 402, $v_{com}$ is a 1.56 sin (2*π*60t) signal command. The feedback signal $v_o'$ is 1/100 of an output AC voltage $v_o$. In one embodiment, the output peak AC voltage is 156V, and the effective value is 110V. The two signals pass through a low-pass filter circuit to reach a comparator. The comparator outputs a result signal to a phase splitting circuit 403, and the result signal is split to two sets of signals having a phase difference of 180 degrees. Each set of signals pass through two cascaded resistor-diode circuits, which form one stage RC discharging circuits with a same capacitor respectively to provide rise and fall delays to two sets of signals, and further provide turn-on (20 μs) and cut-off time (5 μs) delays via the inverter; meanwhile providing a lockout time (15 μs) needed for a upper path and a lower path of inverter switches to interlock each other. In order to deal with zero crossover voltage swing in a low load situation, signal coming from Y1 or Y2 point passing through a circuit comprising two cascaded diodes and one capacitor to extend a turn-on time of another set of signals. Six sets of isolating and current amplification driving circuits 404 drive six independent switches to avoid a common-ground short-circuit phenomenon. The phase splitting circuit 403 connecting inverter, using Low Active optical coupling to isolate and amplify the output current to drive IGBT, because any set of switches in inverter are in turn-on state, therefore $T_1$, $T_2$ should turn on accordingly. The only difference among switches is the turn-on delay time, but no cut-off delay time exists. A logic control circuit 405 process X1, Y1 and X2, Y2 with AND gate operation respectively to obtain the designated signals, later using OR gate operation to turn on any set of inverter signals. The circuit connecting to isolating and current amplification driving circuits 404 via a phase-inverting device to drive the switches in low voltage level.

Figure 5:
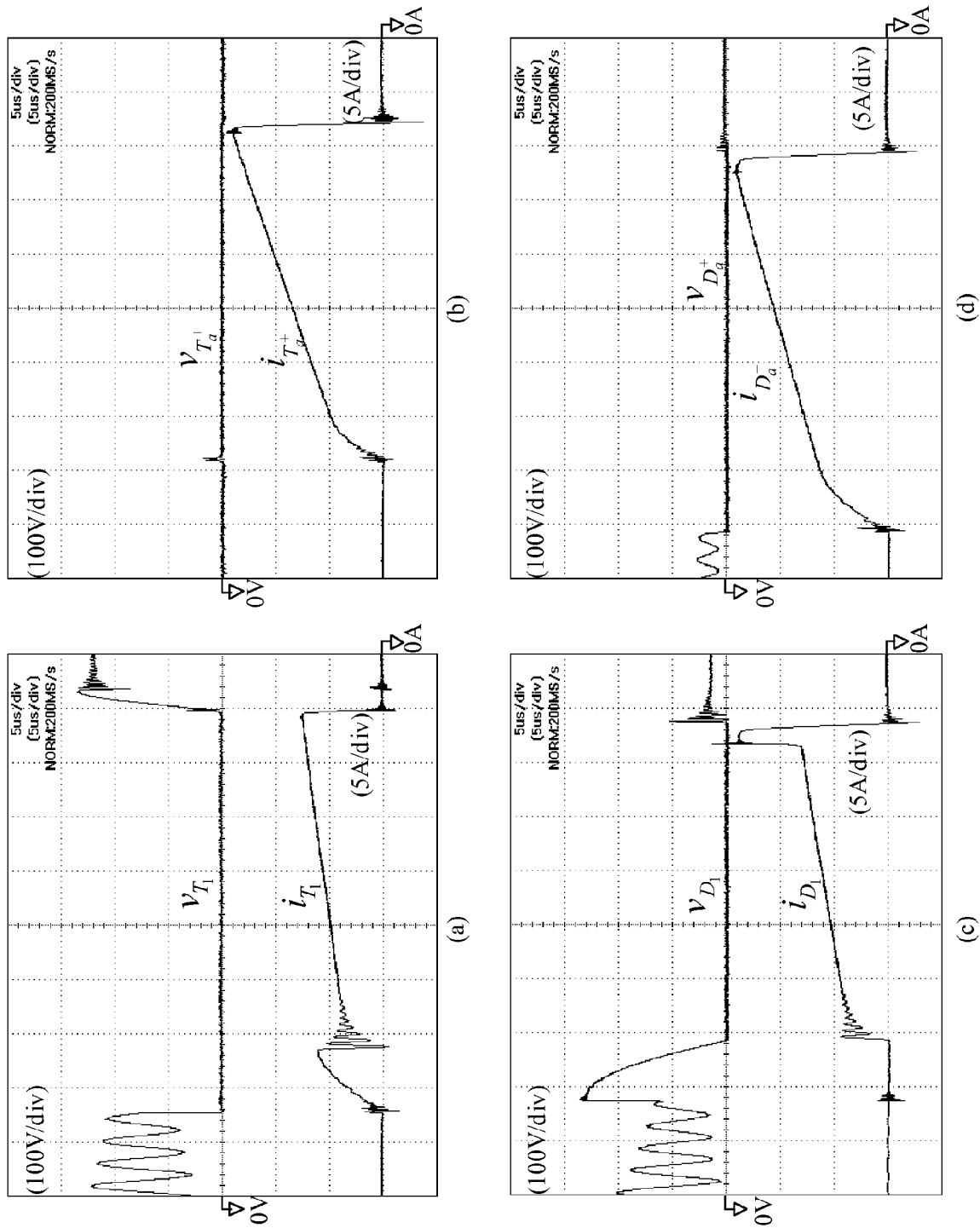
FIG. 5 shows real voltages and soft-switching current waveforms of switches and diodes in the current-source sine wave voltage inverter using voltage-clamping and soft-switching techniques of FIG. 1.
Figure 5:
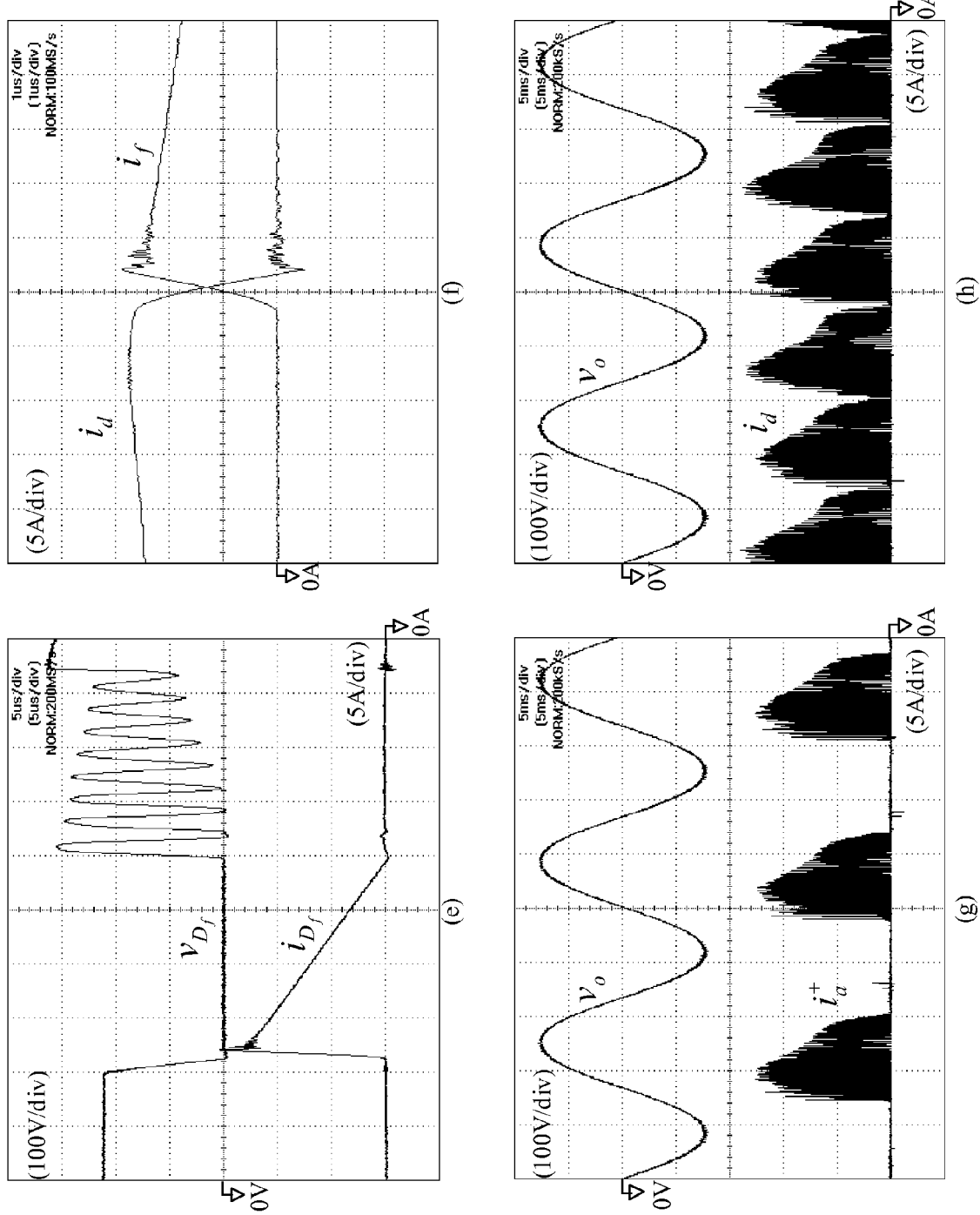

FIG. 5 shows real voltages and soft-switching current waveforms of switches and diodes in the current-source sine wave voltage inverter using voltage-clamping and soft-switching techniques. The waveforms verify the analysis of table 1: FIG. 5(*a*) is the end to end voltage and current waveforms of voltage-clamping switch $T_1$; FIG. 5(*b*) is the end to end voltage and current waveforms of inverter switch $T_a^+$; FIG. 5(*c*) is the end to end voltage and current waveforms of diode $D_1$; FIG. 5(*d*) is the end to end voltage and current waveforms of diode $D_a^+$; FIG. 5(*e*) is the end to end voltage and current waveforms of diode $D_j$; FIG. 5(*f*) is the crossover waveforms of transformer's primary side current $i_d$ and secondary side current $i_d$; FIG. 5(*g*) is the output AC voltage waveform versus the current waveform of inverter switch $T_a^+$; FIG. 5(*h*) is the output AC voltage waveform and waveform of transformer's primary side current $i_d$. From FIG. 5, it is obvious to see the soft-switching characteristics in the embodiment of the present invention, and the effect of control circuit processing zero crossover voltage.

Figure 6:
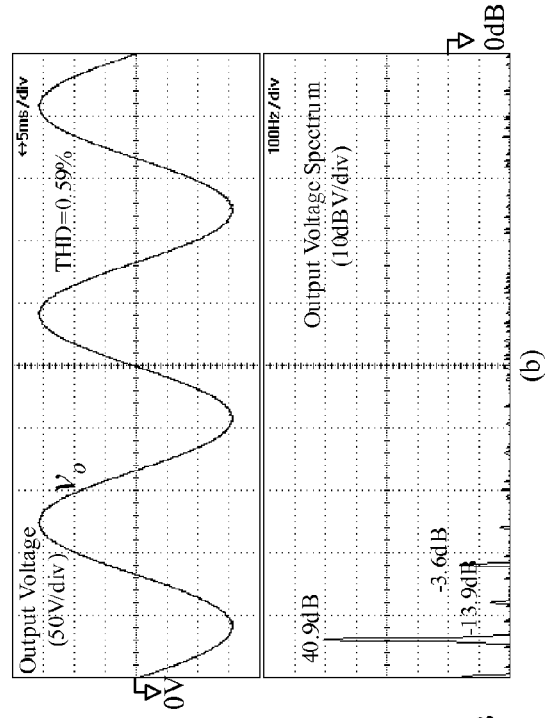
FIGS. 6(a), (c), (e), (g) shows a comparison of the current-source sine wave voltage inverter using voltage-clamping and soft-switching techniques of FIG. 1, and the traditional PWM inverter under the same test environment.
FIGS. 6(b), (d), (f), (h) shows output voltage/current waveforms and response waveforms under various loads of the current-source sine wave voltage inverter using voltage-clamping and soft-switching techniques.
Figure 6:
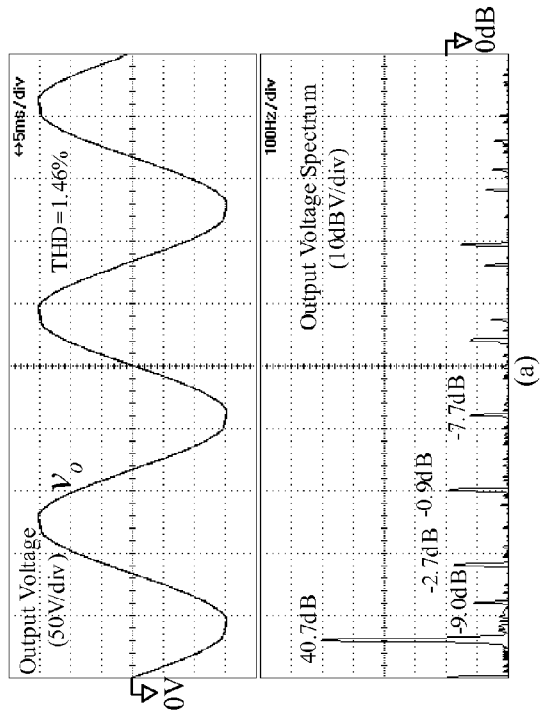
Figure 6:
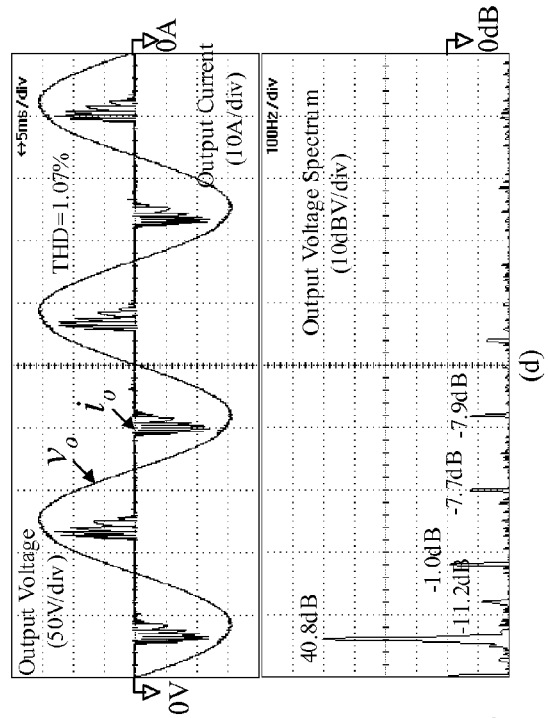
Figure 6:
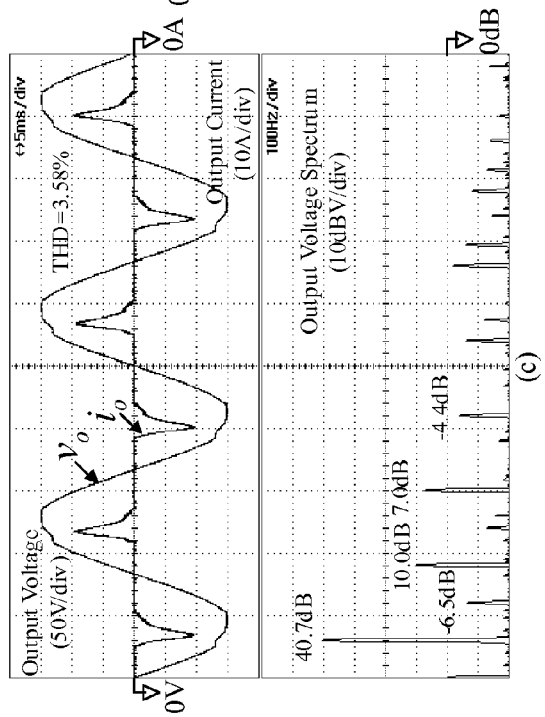
Figure 6:
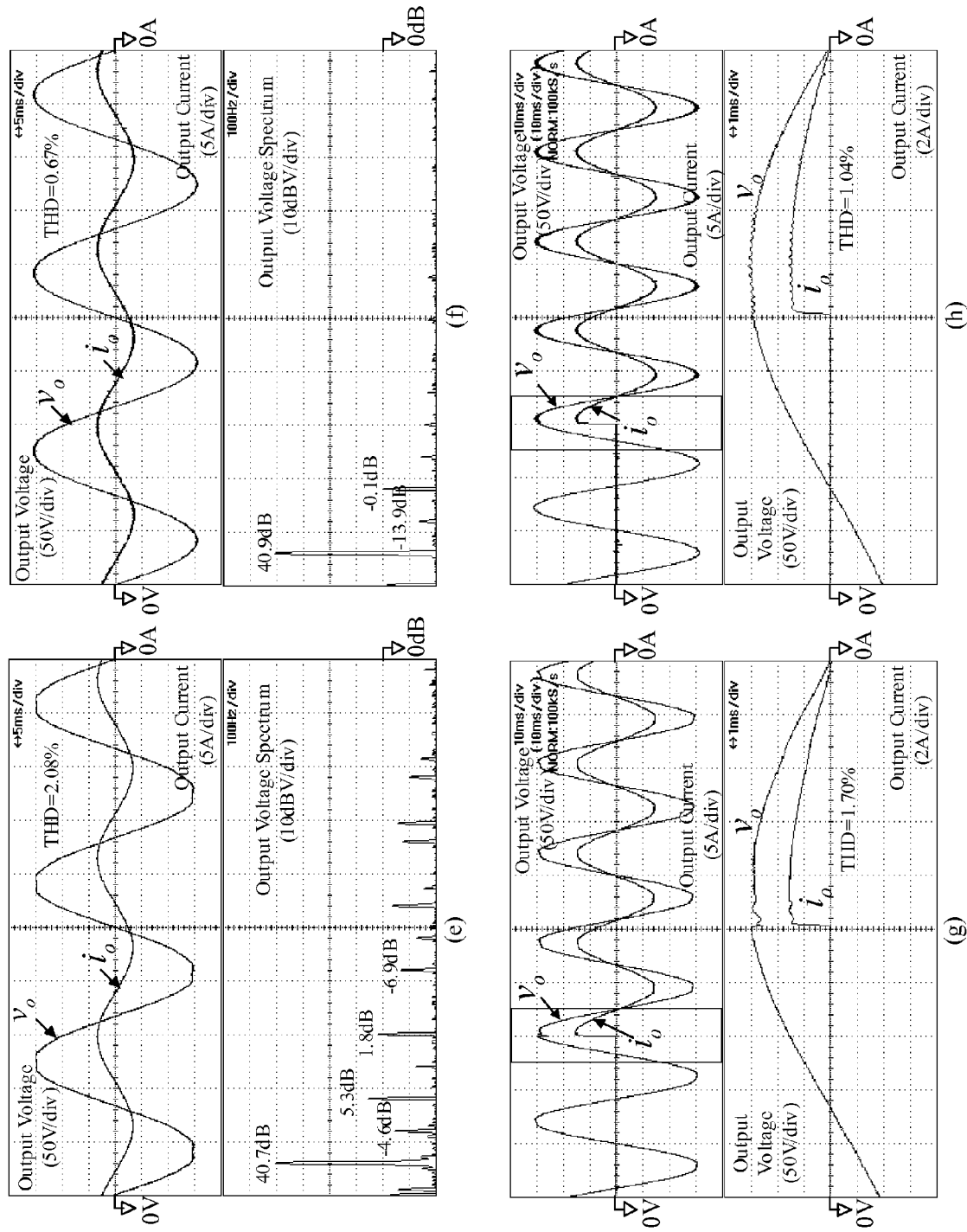

FIG. 6 shows output voltage and a current response waveform versus various loads in the current-source sine wave voltage inverter using voltage-clamping and soft-switching techniques, compared with traditional PWM inverter under the same test condition. FIGS. 6(*a*), (*c*), (*e*) shows the Fourier and THD analysis of a traditional PWM inverter, together with the voltage/current waveform of traditional PWM inverter under no load, non-linear rectifying load and inductive load conditions. FIGS. 6(*b*), (*d*), (*f*) shows the result of the present invention under the same test environment. FIG. 6(*g*) is the voltage/current waveforms of traditional inverter having sudden load and its local view. FIG. 6(*h*) shows the result waveform of the present invention under the same test environment as in FIG. 6(*g*). From the test waveform, the present invention shows less distortion around sine wave peak. Also from the statistics of Fourier analysis and THD, it is obvious that the current-source sine wave voltage driving circuit using voltage-clamping and soft-switching techniques in the present invention can greatly improve the capabilities of the traditional PWM inverter.

Compared with traditional devices, the present invention provides a current-source sine wave voltage inverter using voltage-clamping and soft-switching techniques, which is advantageous in:

1. The present invention uses voltage-clamping technique and quasi-resonant property, and controls the inductance current in discontinuous conduction mode so that all semiconductor switches and diodes have the soft-switching characteristics and the maximum convention efficiency is more than 95%. 2. The clamping circuit used in present invention is able to reduce the voltage specification to be sustained by switches, wherein the rated voltage for switches of clamping circuit drops from 4 times to 2 times the input source voltage, and rated voltage for inverter switches drops from 2 times to the same as input voltage.

3. The value and volume of inductor used in the current source is smaller than those in a prior-art current-source mechanism so that the current source can adjust inductive current promptly to satisfy requirements of supplied loads. In one embodiment, we use EE-55 iron powder core having an inductance value of 300 uH 4. The present invention skips output filter inductor, and the current source charges the output load and filter capacitor directly, therefore it is suitable for various inductive, capacitive and nonlinear loads, even for instant load changes, and better results of Fourier spectrum and output voltage waveform distortion (THD) compared to a traditional PWM scheme.

Figure 7:
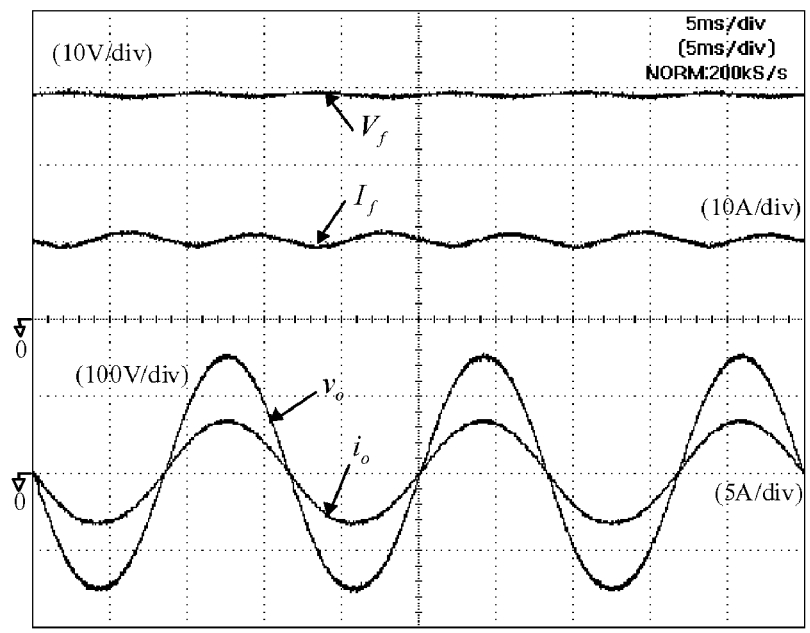
FIG. 7 shows corresponding experimental voltage and current responses of the fuel cell system output terminals of FIG. 1 at 260-watts resistive load.

FIG. 7 shows corresponding experimental voltage and current responses of the fuel cell system output terminals of FIG. 1 at 260-watts resistive load. From the experimental results, the favorable regulation performance of the current-source sine wave voltage inverter ac output voltage under the fuel cell variant dc voltage can be obtained. By observing the fuel cell current waveform, the current ripple within 120 Hz, which is caused by the ac load component, can be diminished by the utilization of a series of ultra-capacitors or electrolytic capacitors with lower equivalent series resistance (ESR) values. These results confirm that this power conversion system can provide stable responses well within the range of specification.

Figure 8:
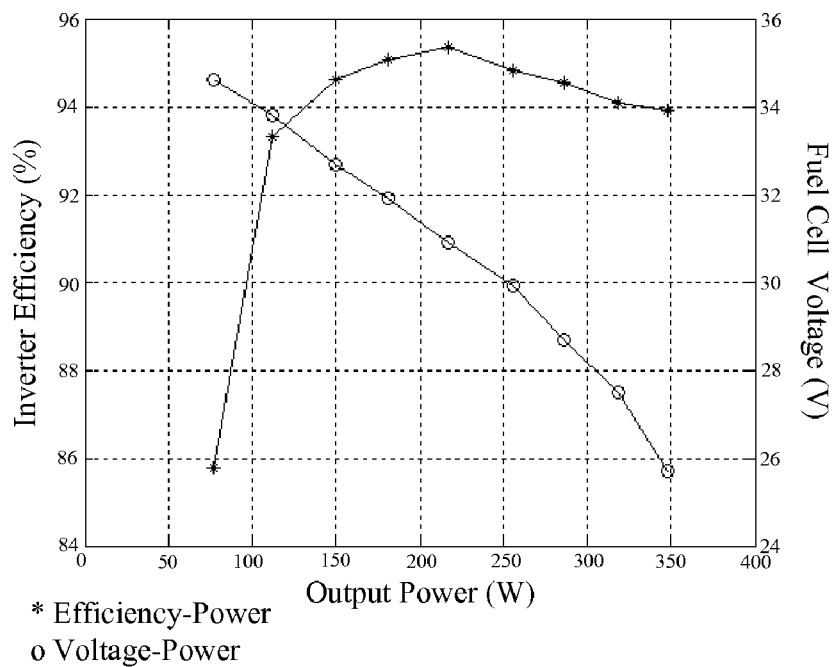
FIG. 8 shows the fuel cell output voltage and the current-source sine wave voltage inverter of FIG. 7 efficiency under different output powers at resistive loads.

FIG. 8 summarizes the fuel cell output voltage and the inverter efficiency in the proposed fuel cell system of FIG. 7 under different output powers at resistive loads. In the experiment, the current-source sine wave voltage inverter efficiency was evaluated using AC Power Analyzer PA4400A equipment, manufactured by the AVPower Company. As can be seen from FIG. 8, the fuel cell output dc voltage is varied with the variation of output powers, and the maximum efficiency is over 95%, which is comparatively higher than conventional inverter. The efficiency of this circuit can be further optimized by building the circuit more compactly via a PCB layout and decreasing the conduction losses via the technique of the MOSFET switches in parallel.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A current-source sine-wave voltage inverter for converting a direct current (DC) voltage to an alternating (AC) voltage, comprising:
    a DC source for providing a DC voltage;
    a current source circuit having a primary side inductance of a transformer;
    a clamping circuit comprising a first switch cascaded with a first diode, a second diode cascaded with a second switch, a first capacitor connected between an anode of the first diode and a cathode of the second diode, a secondary side inductance of the transformer cascaded with a third diode, the secondary side inductance of the transformer and the third diode connected to two ends of the DC source, and a cathode of the third diode connected to an anode of the DC source;
    an inverting circuit, being a full-bridge dc-ac inverting circuit which comprising diagonally opposite a third switch and a fourth switch, a fifth switch and a sixth switch from two legs, a fourth diode, a fifth diode, a sixth diode and a seventh diode used for avoiding the short current from a second capacitor to pass through the first, second, third, fourth, fifth and sixth switches or the first, second, third, fourth, fifth, sixth, and seventh diodes; and a control and driving circuit comprising a single-phase voltage and frequency command signal and then further makes a logic determination, a delay operation, isolates an amplified driving current and triggers and cuts off the first, second, third, fourth, fifth and sixth switches;

when an output voltage is at an upper half cycle of the sine wave, current flowing from the DC source through the primary side inductance and the first and second switches, then via the third and fourth switches to charge the second capacitor;

when an output voltage is at a lower half cycle of the sine wave, the first, second, third, and fourth switches turn on at the same time to discharge the second capacitor;

when the primary side inductance is forward-biased, the third diode is reverse-biased, no current flowing through the secondary side inductance, and current on the primary side inductance storing energy at the transformer; when the first and second switches cut off, the primary side inductance reverses a voltage polarity (the polarity of the black spots is negative), the third diode is forward-biased, a current on the secondary side inductance will release the energy stored in the transformer to the DC source; and during the energy releasing time, the voltage value of the secondary side inductance is the same as the source's, and the voltage value of the primary side inductance will be limited by turns ratio of the primary and secondary side inductances;

wherein the first capacitor and the first and second diodes all connect either sides of the first and second switches to enable a zero voltage switching (ZVS) property of the first and second switches when the first and second switches cut off;

when a current on the secondary side inductance is zero, which means all stored energy in the transformer has been released, then if any one of the first, second, third, fourth, fifth and sixth switches on the primary side turns on, it will have a zero current switching (ZCS) property.

2. The current-source sine-wave voltage inverter of claim 1, wherein the control and driving circuit comprises a feedback control circuit, a phase splitting circuit, a logic control circuit, and an isolating and current amplification driving circuit, the feedback control circuit includes a low-pass filter circuit and a comparator, wherein the feedback control circuit inputs a result obtained by a comparator and then forwards the result to the phase splitting circuit to obtain a phase-split signal, the phase-split signal is split into two sets of signals having a phase difference of 180 degrees as compared to each other, each of the two sets of signals flows through a first-order RC charging and discharging circuit formed of a two-path diode circuit connected in series with a resistor and a same capacitor so as to add a rise delay and a fall delay on a same signal source, add an on-time delay and an off-time delay through the inverter and provide a time required for an interlock of an upper and a lower branch switches, the logic control circuit is used to eliminate the delay of the off-time by using an AND gate in the phase-split circuit and to provide front stage triggering signals of the first and second switches in the clamping circuit, and the isolation and current amplification circuits is used to drive the first, second, third, fourth, fifth and sixth switches so as to prevent short circuit is occurred with respect to the first, second, third, fourth, fifth and sixth switches.

3. The current-source sine-wave voltage inverter of claim 1, wherein the first and second switches of the clamping circuit clamp two times a voltage provided by the DC source when the transformer thereof has a winding number ratio of the primary and secondary side turns of 1:1 and a voltage of the primary side inductance being inversely proportional to the winding number ratio when the winding number ratio is varied.

4. The current-source sine-wave voltage inverter of claim 1, when the transformer having a 1:1 ratio for a primary side's inductance value and a secondary side's inductance value, a maximum voltage value to be sustained by the clamping circuit is twice a value of the DC source, therefore, changing a ratio of the primary side's inductance value and the secondary side's inductance value will change a voltage of the primary side inductance to be sustained by the first and second switches.

5. The current-source sine-wave voltage inverter of claim 1, wherein the clamping circuit is using voltage-clamping, quasi-resonant techniques and is controlling the inductance current in discontinuous conduction mode so that when the first and second switches, the first and second diodes in the clamping circuit are on or off, the first and second switches, the first and second diodes respectively have ZVS or ZCS switching properties.

6. The current-source sine-wave voltage inverter of claim 5, wherein the third, fourth, fifth and sixth switches have both ZVS and ZCS switching properties, and the third, fourth, fifth, sixth, and seventh diodes have both ZVS and ZCS switching properties.

7. The current-source sine-wave voltage inverter of claim 1, which generates a single-phase 60 Hz sine wave voltage.

8. A fuel cell system, comprising:
a fuel cell for providing a direct current (DC) voltage, the fuel cell comprising an anode, a cathode, a catalyst and an electrolyte, wherein the anode, used as a negative post in the fuel cell, disperses hydrogen gases equally over the entire catalyst surface and conducts electrons for being used as power in an external circuit, and the cathode, used as a positive post in the fuel cell, distributes oxygen fed to it onto the catalyst surface and conducts electrons back from the external circuit, and the catalyst is a special material used to facilitate the oxygen and hydrogen reaction;

a DC to DC converter circuit comprising a first and second coupled windings, a third capacitor having an electrode connected to coupled ends of the first and second winding, and a transistor cascaded between the anode of the fuel cell and the coupled ends of the first and second windings; and a current-source sine-wave voltage inverter for converting the DC voltage to an alternating (AC) voltage, the current-source sine-wave voltage inverter comprising:
a current source circuit having a primary side inductance of a transformer;
a clamping circuit comprising a first switch cascaded with a first diode, a second diode cascaded with a second switch, a first capacitor connected between an anode of the first diode and a cathode of the second diode, a secondary side inductance of the transformer cascaded with a third diode, the secondary side inductance of the transformer and the third diode connected to two ends of the DC source, and a cathode of the third diode connected to an anode of the DC source;
an inverting circuit, being a full-bridge dc-ac inverting circuit which comprising diagonally opposite a third switch and a fourth switch, a fifth switch and a sixth switch from two legs, a fourth diode, a fifth diode, a sixth diode and a seventh diode used for avoiding the short current from a second capacitor to pass through the first, second, third, fourth, fifth and sixth switches or the first, second, third, fourth, fifth, sixth, and seventh diodes; and
a control and driving circuit comprising a single-phase voltage and frequency command signal and then further makes a logic determination, a delay operation, isolates an amplified driving current and triggers and cuts off the first, second, third, fourth, fifth and sixth switches;
when an output voltage is at an upper half cycle of the sine wave, current flowing from the DC source through the primary side inductance and the first and second switches, then via the third and fourth switches to charge the second capacitor;
when an output voltage is at a lower half cycle of the sine wave, the first, second, third, and fourth switches turn on at the same time to discharge the second capacitor;
when the primary side inductance is forward-biased, the third diode is reverse-biased, no current flowing through the secondary side inductance, and current on the primary side inductance storing energy at the transformer; when the first and second switches cut off, the primary side inductance reverses a voltage polarity (the polarity of the black spots is negative), the third diode is forward-biased, a current on the secondary side inductance will release the energy stored in the transformer to the DC source; and during the energy releasing time, the voltage value of the secondary side inductance is the same as the source's, and the voltage value of the primary side inductance will be limited by turns ratio, therefore the structure disclosed herein is able to clamp two times the voltage of the DC source;
wherein the first capacitor and the first and second diodes all connect either sides of the first and second switches to enable a zero voltage switching (ZVS) property of the first and second switches when the first and second switches cut off;
when a current on the secondary side inductance is zero, which means all stored energy in the transformer has been released, then if any one of the first, second, third, fourth, fifth and sixth switches on the primary side turns on, it will have a zero current switching (ZCS) property.

9. The fuel cell system of claim 8, wherein the fuel cell further comprising an ultracapacitor $C_i$ and a diode $D_i$ cascaded with each other, the ultracapacitor $C_i$ having an electrode electrically connected to the anode of the fuel cell, the diode $D_i$ having an anode electrically connected to the cathode of the fuel cell.

10. The fuel cell system of claim 8, wherein the fuel cell is a Proton exchange membrane fuel cell (PEMFC).

11. The fuel cell system of claim 8, wherein the DC-DC converter circuit is a high-efficiency, high step-up dc-dc converter.

12. The fuel cell system of claim 8, wherein the control and driving circuit comprises a feedback control circuit, a phase splitting circuit, a logic control circuit, and an isolating and current amplification driving circuit, the feedback control circuit includes a low-pass filter circuit and a comparator,
wherein the feedback control circuit inputs a result obtained by a comparator and then forwards the result to the phase splitting circuit to obtain a phase-split signal, the phase-split signal is split into two sets of signals having a phase difference of 180 degrees as compared to each other, each of the two sets of signals flows through a first-order RC charging and discharging circuit formed of a two-path diode circuit connected in series with a resistor and a same capacitor so as to add a rise delay and a fall delay on a same signal source, add an on-time delay and an off-time delay through the inverter and provide a time required for an interlock of an upper and a lower branch switches, the logic control circuit is used to eliminate the delay of the off-time by using an AND gate in the phase-split circuit and to provide front stage triggering signals of the first and second switches in the clamping circuit, and the isolation and current amplification circuits is used to drive the first, second, third, fourth, fifth and sixth switches so as to prevent short circuit is occurred with respect to the first, second, third, fourth, fifth and sixth switches.

13. The fuel cell system of claim 8, wherein the first and second switches of the clamping circuit clamp two times a voltage provided by the DC source when the transformer thereof has a winding number ratio of the primary and secondary side turns of 1:1 and a voltage of the primary side inductance being inversely proportional to the winding number ratio when the winding number ratio is varied.

14. The fuel cell system of claim 8, when the transformer having a 1:1 ratio for a primary side's inductance value and a secondary side's inductance value, a maximum voltage value to be sustained by the clamping circuit is twice a value of the DC source, therefore, changing a ratio of the primary sides's inductance value and the secondary side's inductance value will change a voltage of the primary side inductance to be sustained by the first and second switches.

15. The fuel cell system of claim 8, wherein the clamping circuit is using voltage-clamping, quasi-resonant techniques and is controlling the inductance current in discontinuous conduction mode so that when the first and second switches, the first and second diodes in the clamping circuit are on or off, the first and second switches, the first and second diodes respectively have ZVS or ZCS switching properties.

16. The fuel cell system of claim 15, wherein the third, fourth, fifth and sixth switches have both ZVS and ZCS switching properties, and the third, fourth, fifth, sixth, and seventh diodes have both ZVS and ZCS switching properties.

17. The fuel cell system of claim 8, which generates a single-phase 60 Hz sine wave voltage.

* * * * *